US012775875B2

(12) United States Patent
Hong et al.

(10) Patent No.: US 12,775,875 B2
(45) Date of Patent: Oct. 27, 2026

(54) METHOD FOR GENERATING TASK MODEL BASED ON META-LEARNING, METHOD FOR GENERATING TEXT EMBEDDINGS FOR FEW-SHOT TEXT DATA, AND APPARATUS IMPLEMENTING THE SAME METHOD

(71) Applicant: SAMSUNG SDS CO., LTD., Seoul (KR)

(72) Inventors: Seung Ki Hong, Seoul (KR); Tae Young Jang, Seoul (KR); Jong Yoon Jo, Seoul (KR); Ji Hyung Youn, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 910 days.

(21) Appl. No.: 18/091,862

(22) Filed: Dec. 30, 2022

(65) Prior Publication Data

US 2023/0214718 A1 Jul. 6, 2023

(30) Foreign Application Priority Data

Dec. 31, 2021 (KR) ........................ 10-2021-0194405

(51) Int. Cl.
*G06N 20/00* (2019.01)
*G06F 40/284* (2020.01)

(52) U.S. Cl.
CPC ........... *G06N 20/00* (2019.01); *G06F 40/284* (2020.01)

(58) Field of Classification Search
CPC .............................. G06N 20/00; G06F 40/284
See application file for complete search history.

(56) References Cited

U.S. PATENT DOCUMENTS

| | | | | |
|---|---|---|---|---|
| 10,140,976 | B2 | 11/2018 | Suzuki et al. | |
| 2019/0156210 | A1* | 5/2019 | He | G06N 3/048 |
| 2020/0251100 | A1* | 8/2020 | Tan | G06N 3/096 |
| 2020/0372225 | A1 | 11/2020 | Xu et al. | |
| 2021/0035556 | A1 | 2/2021 | Shen et al. | |

(Continued)

FOREIGN PATENT DOCUMENTS

CN 112308123 A 2/2021

OTHER PUBLICATIONS

Baik, Sungyong, Janghoon Choi, Heewon Kim, Dohee Cho, Jaesik Min, and Kyoung Mu Lee. "Meta-learning with task-adaptive loss function for few-shot learning." In Proceedings of the IEEE/CVF international conference on computer vision, pp. 9465-9474. 2021. (Year: 2021).*

(Continued)

*Primary Examiner* — Casey R. Garner
(74) *Attorney, Agent, or Firm* — Sughrue Mion, PLLC

(57) ABSTRACT

The present disclosure according to at least one embodiment provides a method performed by a computing device for generating a task model based on meta-learning, including calculating a task-adaptation loss of the task model, the calculating the task-adaptation loss being based on a result of training the task model by using a training data set, updating the task model based on the task-adaptation loss, calculating a meta-optimization loss of the updated task model by using a validation data set, and further updating the updated task model based on the meta-optimization loss.

12 Claims, 8 Drawing Sheets

(56) References Cited

U.S. PATENT DOCUMENTS

| | | | |
|---|---|---|---|
| 2021/0089724 A1 | 3/2021 | Luong et al. | |
| 2022/0172036 A1* | 6/2022 | Schwartz | G06N 3/08 |

OTHER PUBLICATIONS

Rusu, Andrei A., Dushyant Rao, Jakub Sygnowski, Oriol Vinyals, Razvan Pascanu, Simon Osindero, and Raia Hadsell. " Meta-learning with latent embedding optimization." arXiv preprint arXiv:1807.05960 (2018). (Year: 2018).*

Finn, Chelsea et al., "Model-Agnostic Meta-Learning for Fast Adaptation of Deep Networks", Proceedings of the 34th International Conference on Machine Learning, Sydney, Australia, PMLR 70, 2017. (10 pages total).

Geng, Ruiying et al., "Induction Networks for Few-Shot Text Classification", Proceedings of the 2019 Conference on Empirical Methods in Natural Language Processing and the 9th International Joint Conference on Natural Language Processing, pp. 3904-3913, Hong Kong, China, Nov. 3-7, 2019. (10 pages total).

Xu, Hu et al. "Lifelong Domain Word Embedding via Meta-Learning", arXiv: 1805.09991v1 [cs.CL], May 25, 2018. (7 pages total).

Communication issued May 15, 2026 by the Korean Ministry of Intellectual Property in Korean Patent Application No. 10-2021-0194405.

* cited by examiner

FIG. 6A

61 ~ $$e_n^{\tau_i} = \frac{1}{NK^2} \sum_{k_n=1}^{K} \sum_{m=1}^{N} \sum_{k_m=1}^{K} f_{\theta_r} \left( f_{\theta_e} \left( c_{k_n}^{\tau_i} \right), f_{\theta_e} \left( c_{k_m}^{\tau_i} \right) \right)$$

FIG. 6B

62 ~ $$g_n^{\tau_i} = softmax \left( G \left( e_n^{\tau_i}; W_g, W_n, k \right) \right)$$

FIG. 6C

63 ~ $$W_A^{\tau_i} = \left( (W_A)^T g_n^{\tau_i} \right)^T$$

FIG. 7A

TABLE I: Results of 5-way 1-shot classification

| | 20 Newsgroup | HuffPost | Reuters | RCV1 |
|---|---|---|---|---|
| MAML | 43.58% | 35.27% | 43.82% | 36.69% |
| PROTO | 34.78% | 28.62% | 46.78% | 34.40% |
| LEO | 36.42% | 28.75% | 35.37% | 32.26% |
| INDUCTION | 43.04% | 35.62% | 42.73% | 36.24% |
| DS | 41.79% | 25.52% | 52.32% | 44.35% |
| **OUR** | **53.47%** | **48.43%** | **71.64%** | **51.96%** |

Note: The highest performance in each dataset is highlighted in Bold. And, all evaluations were performed without fine-tuning of BERT

FIG. 7B

TABLE II: Results of 5-way 5-shot classification

| | 20 Newsgroup | HuffPost | Reuters | RCV1 |
|---|---|---|---|---|
| MAML | 52.73% | 44.22% | 56.86% | 40.47% |
| PROTO | 55.07% | 45.56% | 51.22% | 44.05% |
| LEO | 52.17% | 42.25% | 54.07% | 47.42% |
| INDUCTION | 53.11% | 44.22% | 48.00% | 45.76% |
| DS | 52.5% | 37.01% | 80.80% | 68.52% |
| **OUR** | **65.88%** | **71.6%** | **83.07%** | **73.81%** |

Note: The highest performance in each dataset is highlighted in Bold. And, all evaluations were performed without fine-tuning of BERT

METHOD FOR GENERATING TASK MODEL BASED ON META-LEARNING, METHOD FOR GENERATING TEXT EMBEDDINGS FOR FEW-SHOT TEXT DATA, AND APPARATUS IMPLEMENTING THE SAME METHOD

CROSS-REFERENCE TO RELATED APPLICATION

This application claims priority from Korean Patent Application No. 10-2021-0194405 filed on Dec. 31, 2021, in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method of generating a task model based on meta-learning, a method of generating text embeddings for few-shot data, and an apparatus implementing the same. More particularly, the present disclosure relates to a meta-learning-based task-model generating method for generating a task model through meta-learning and then generating their related task model, a method of generating text embeddings for few-shot data, and an apparatus implementing the same.

2. Description of the Related Art

In recent natural language processing and text analysis fields, to utilize a large-scale pre-trained language model, there is a currently used method involving taking a sufficient amount of label data from a target domain, tuning the language model itself to adapt to the target domain, and thereby performing transfer learning in accord with the target domain.

However, in an actual environment, securing a sufficient amount of label data is difficult due to the considerable cost and time required in the process of obtaining sufficient label data from a new domain.

Whereas a small amount of or few-shot label data is simply insufficient for adequately tuning a large-scale language model to a target domain. In particular, in the matter of classification of few-shot text data, which constraints the classification model to be trained with a small amount of training data, transfer learning is very difficult to perform on a large-scale language model. Additionally, in the classification of few-shot text data, upon encountering for the first time, a new domain or a new label category class, the large-scale language model cannot be properly tuned to the matter to be solved. In particular, actively utilizing pre-trained large-scale language models such as BERT and GPT-3 is difficult in the classification of few-shot text data.

Additionally, in performing the text classification based on the pre-trained language model, the text embedding vector provided by the language model is mainly transmitted as an input to the classification model.

More specifically, when text data is inputted into the language model, a text embedding vector is generated for that text data, and the generated text embedding vector is inputted into the classification model. Accordingly, the classification model generates and outputs a classification result for the inputted text embeddings vector.

In this process, since the classification model generates a classification result according to the text embeddings vector received from the language model, the language model depends highly on the text embeddings.

Therefore, when classifying text data by using a language model, there is a need to generate text embeddings well adapted to data in a new domain even without needing the large-scale language model itself to be tuned to the domain. Additionally, there is a need for a technique capable of generating text embeddings well adapted to a new domain and a task model related thereto with text data by a small amount rather than a sufficiently secured amount.

SUMMARY

Aspects of the present disclosure concern the matter of classification of few-shot text data and, to be able to generate text embeddings well adapted to a new domain even without needing a large-scale language model itself to be tuned to a domain, provide a method of generating a task model based on meta-learning, a method of generating text embeddings for few-shot data, and an apparatus implementing the same.

Other aspects of the present disclosure concern the matter of classification of few-shot text data and, to be able to generate a task model well adapted to a new domain based on meta-learning by training the task model with data in various domains, provide a meta-learning based task-model generating method, a method of generating text embeddings for few-shot data, and an apparatus implementing the same.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a method performed by a computing device, including calculating a task-adaptation loss of a task model, the calculating the task-adaptation loss being based on a result of training the task model by using a training data set, updating the task model based on the task-adaptation loss, calculating a meta-optimization loss of the updated task model by using a validation data set, and further updating the updated task model based on the meta-optimization loss.

According to another aspect of the present disclosure, there is provided a method performed by a computing device for generating text embeddings for few-shot data, generating token embeddings and class (CLS) embeddings by inputting few-shot text data into a language model, generating feature information corresponding to a domain of the few-shot text data by inputting the CLS embeddings into a relation network and a gating network, and generating the text embeddings corresponding to the domain of the few-shot text data by synthesizing the token embeddings and the feature information.

According to yet another aspect of the present disclosure, there is provided a non-transitory computer-readable medium storing a computer program including computer-executable instructions for causing, when executed in a computing device, the computing device to perform the above-described methods.

According to yet another aspect of the present disclosure, there is provided a computing device including one or more processors, a communication interface configured to communicate with external devices, a memory configured to load a computer program that is executed by the one or more processors, and a storage configured to store the computer program. The computer program includes computer-executable instructions for causing, when executed in the computing device, cause the computing device to calculating a task-adaptation loss of task model, the calculating the task-adaptation loss being based on a result of training the task model by using a training data set, updating the task model based on the task-adaptation loss, calculating a meta-optimization loss of the updated task model by using a validation data set, and further updating the updated task model based on the meta-optimization loss.

According to yet another aspect of the present disclosure, there is provided a computing device including one or more processors, a communication interface configured to communicate with external devices, a memory configured to load a computer program that is executed by the processor, and a storage configured to store the computer program. The computer program includes computer-executable instructions for causing when executed in the computing device, the computing device to perform method steps that include inputting few-shot text data into a language model to generate token embeddings and class (CLS) embeddings, generating feature information corresponding to domain of the few-shot text data by inputting the CLS embeddings into a relation network and a gating network, and synthesizing the token embeddings and the feature information to generate the text embeddings corresponding to the domain of the few-shot text data.

BRIEF DESCRIPTION OF THE DRAWINGS

The above and other aspects and features of the present disclosure will become more apparent by describing in detail exemplary embodiments thereof with reference to the attached drawings, in which:

FIGS. 6A, 6B and 6C are equations for calculating a relation vector, a gating vector, and feature information, according to some embodiments of the present disclosure.

FIGS. 7A and 7B illustrate the performances of classification models according to some embodiments of the present disclosure compared to other classification models for few-shot text data.

DETAILED DESCRIPTION OF THE EMBODIMENTS

Figure 1:
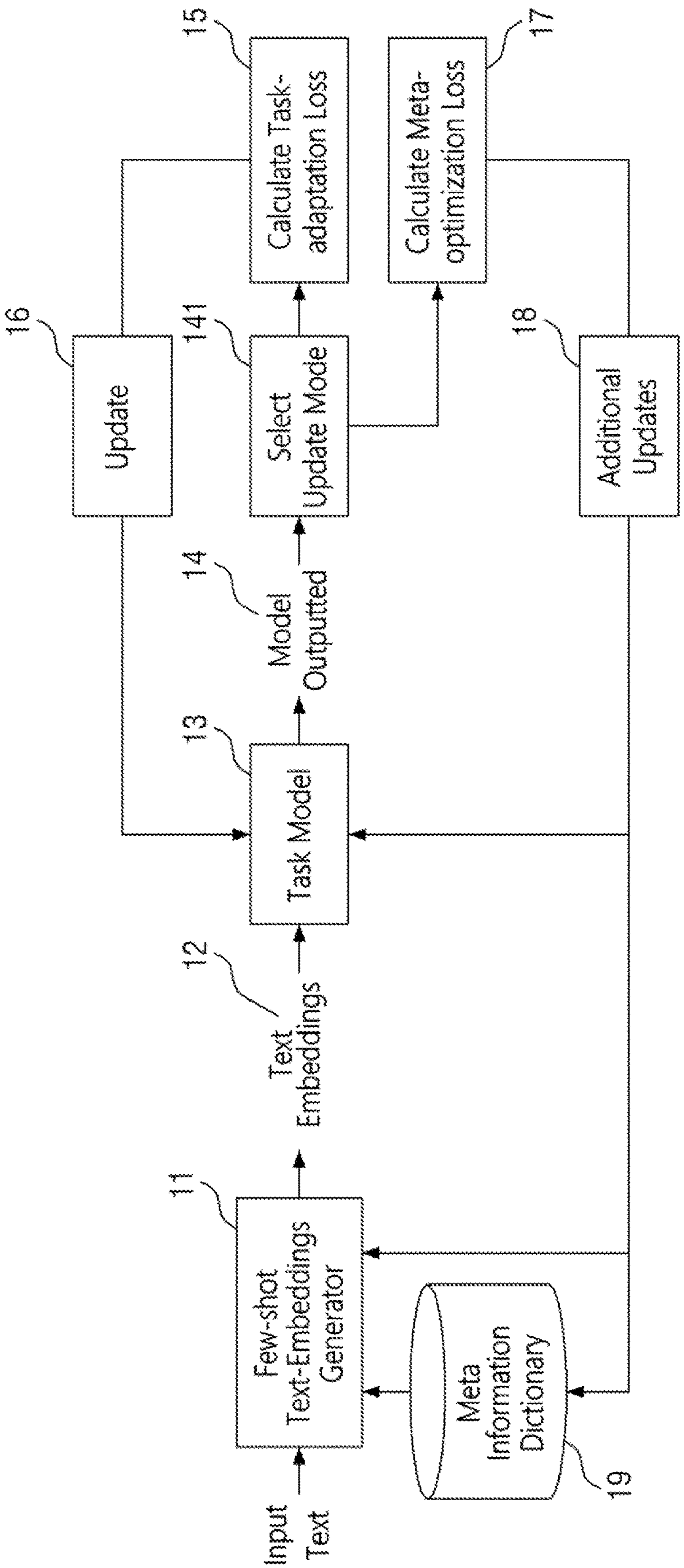
FIG. 1 is a diagram illustrating an overall process for generating a task model based on meta-learning, according to at least one embodiment of the present disclosure.

Hereinafter, preferred embodiments of the present disclosure will be described with reference to the attached drawings. The advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present disclosure will be described in detail with reference to the accompanying drawings.

Figure 8:
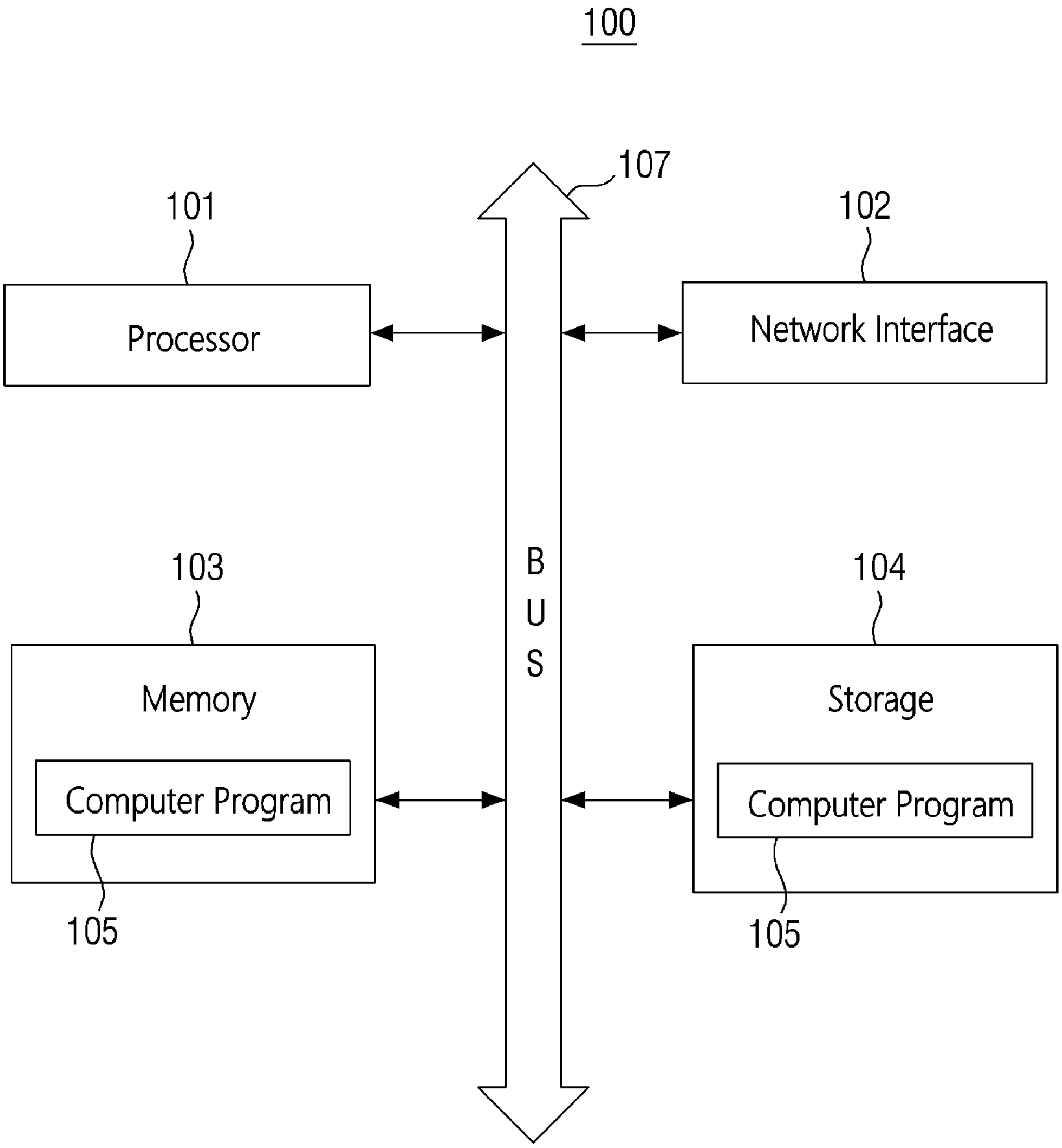
FIG. 8 is a diagram of a hardware configuration of an exemplary computing device capable of implementing methods according to some embodiments of the present disclosure.

FIG. 1 is a diagram illustrating an overall process for generating a task model based on meta-learning, according to at least one embodiment of the present disclosure. Referring to FIG. 1, a task model 13 may be generated based on meta-learning by a computing device (as shown in FIG. 8 at 100) to classify text data. In this case, the text data may include only a limited number of data items or few-shot data. The task model 13 may be, for example, a classification model.

First, the computing device 100 is responsive to an input text as inputted to a few-shot text embedding generator 11 for using a meta information dictionary 19 to generate and output text embeddings 12 adapted to the domain of the input text, from the few-shot text embedding generator 11. At this time, the generated text embeddings 12 are inputted to the task model 13, thereby outputting a task model 14.

The computing device 100 performs a two-step update operation for meta-learning on the outputted task model 14. To this end, the computing device 100 may select an inner update mode or an outer update mode in step 141 as the update mode. The inner update is an operation performed by a meta learner to adapt the task model 14 to a meta-train data set, and the outer update is an operation performed to evaluate, by using a meta meta-validation data set, the task model 14 whether its adaptation is well done, and to train the meta learner by reflecting the evaluation on the meta learner. Here, the meta learner may be a neural network model used when training the task model. The meta-train data set and the meta-validation data set may include a plurality of domain-specific text data. However, the meta-train data set and the meta-validation data set may consist of data in the same domain.

When the computing device 100 selects the inner update mode in step 141 as the first step for meta-learning, the meta learner calculates a task-adaptation loss in step 15 by using the meta-train data set. At this time, the computing device 100 performs an update operation step 16 on the task model 14 by using the calculated task-adaptation loss 15.

The update operation step 16 is to update the parameters constituting the task model 14, and the calculated task-adaptation loss 15 may be used to determine how much to update the parameters. The updating of the parameters of the task model 14 may use gradient descent that can reduce an error through changes in the gradient of a loss function.

When the computing device 100 selects the outer update mode in step 141 as the second step for meta-learning, the meta learner calculates a meta-optimization loss in step 17 by using the meta-validation data set. At this time, the computing device 100 performs an additional update operation step 18 on the task model 14 by using the calculated meta-optimization loss 17.

The additional update operation step 18 is to further update the parameters constituting the task model 14 updated through the update operation step 16, and the calculated meta-optimization loss 17 may be used to determine how much to update the parameters. The further updating of the parameters of the task model 14 may use the gradient descent previously used in the update operation step 16.

When performing the additional update operation step 18, along with the operation of further updating the parameters of the task model 14, the computing device 100 may update the meta information dictionary 19 and the parameters of the few-shot text embedding generator 11.

On the other hand, task-adaptation loss 15 and the meta-optimization loss 17 may be calculated based on the cross-entropy loss function as shown in Equation 1 below.

$$\mathcal{L} = \sum_{n=0}^{N} \sum_{i=0}^{C} t_i \log(s(f(\mathcal{E}_n))_i), \qquad \text{Equation 1}$$

wherein $\varepsilon_n$ is the text embedding corresponding to the domain of the n-th text data, f(•) is the task model, s(•) is the softmax function, $t_i$ is the probability of the i-th class appearing, C is the number of classes, N is the number of data items.

Additionally, in the update operation step 16, the parameters of the task model 14 may be updated through a calculation process such as Equation 2 below, and in the additional update operation step 18, the parameters of the task model 14 may be updated through a calculation process such as Equation 3 below.

$$\theta'_m \leftarrow \theta'_m - \alpha \nabla_{\theta'_m} \mathcal{L}(f(\cdot), \mathcal{E}_n^{train}), \qquad \text{Equation 2}$$

wherein $$\mathcal{E}_n^{train}$$

is the text embeddings generated by using a meta-train data set and $\theta'_m$ is the parameters constituting the task model.

$$\varphi \leftarrow \varphi - \alpha \nabla_{\varphi} \mathcal{L}(f(\cdot), \mathcal{E}_n^{val}), \qquad \text{Equation 3}$$

wherein $$\mathcal{E}_n^{val}$$

is the text embeddings generated by using the meta-validation data set, φ is the parameters that constitute the task model, meta information dictionary, and few-shot text embedding generator.

According to the embodiment as described above, in the classification of text data, the present disclosure can generate, based on meta-learning, a task model well adapted to a new domain by training the task model with data in various domains.

Figure 2:
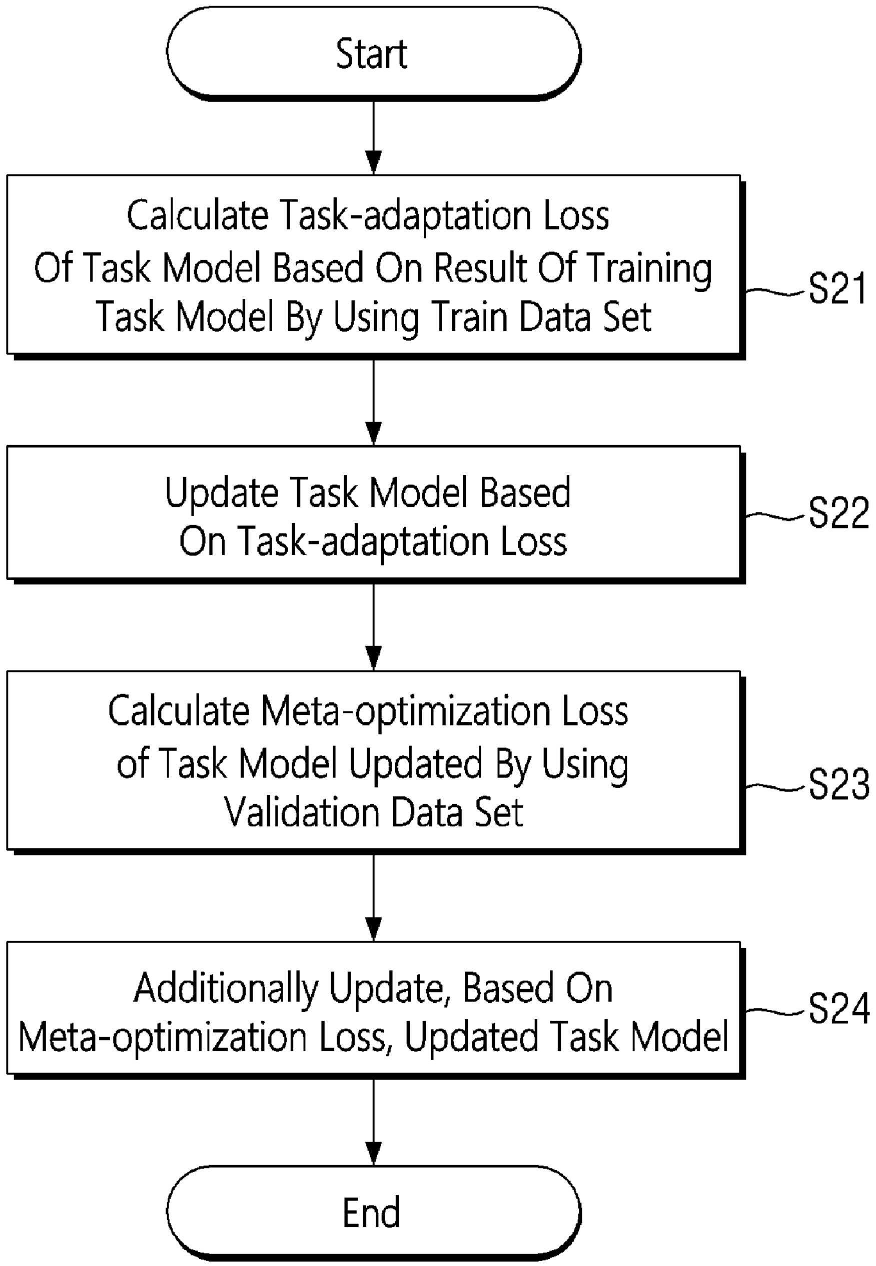
FIG. 2 is a flowchart of a method of generating a task model based on meta-learning, according to at least one embodiment of the present disclosure.

FIG. 2 is a flowchart of a method of generating a task model based on meta-learning, according to at least one embodiment of the present disclosure. FIG. 2 is to explain, within the entire meta-learning-based process of generating the task model as described in FIG. 1, the process of generating, based on meta-learning, the task model through the two-step update operation at steps 16 and 18 for the task model 14.

The method for meta-learning-based generation of a task model according to at least one embodiment of the present disclosure may be executed by the computing device 100. The computing device 100 executing the method according to embodiments of the present disclosure may be a computing device having an environment for executing an application program. It should be noted that the present disclosure may omit, from the description, the subject performing some operations included in the method according to the embodiments of the present disclosure, wherein the subject is the computing device 100.

Referring to FIG. 2, first, in Step S21, a task-adaptation loss for the task model is calculated based on the result of training the task model by using a train data set. In this case, the task model may be a classification model for classifying input data. The task-adaptation loss may be calculated by using the cross-entropy loss function.

In Step S22, the task model is updated based on the task-adaptation loss calculated in Step S21. In this case, the calculated task-adaptation loss may be used to update parameters constituting the task model.

Then, in Step S23, a validation data set may be used to calculate a meta-optimization loss for the task model updated in Step S22. Using the meta-optimization loss, the computing device 100 may evaluate the updated task model on whether its adaptation is well done. The meta-optimization loss may also be calculated by using the cross-entropy loss function.

Finally, in Step S24, the updated task model is further updated based on the meta-optimization loss calculated in Step S23. At this time, the calculated meta-optimization loss may be used to further update parameters constituting the updated task model.

Step S24 may further include a step of updating a meta information dictionary including feature information for a plurality of domain-specific texts, and a step of updating parameters constituting a few-shot text embedding generator for generating text embeddings corresponding to inputted few-shot text data.

Figure 3:
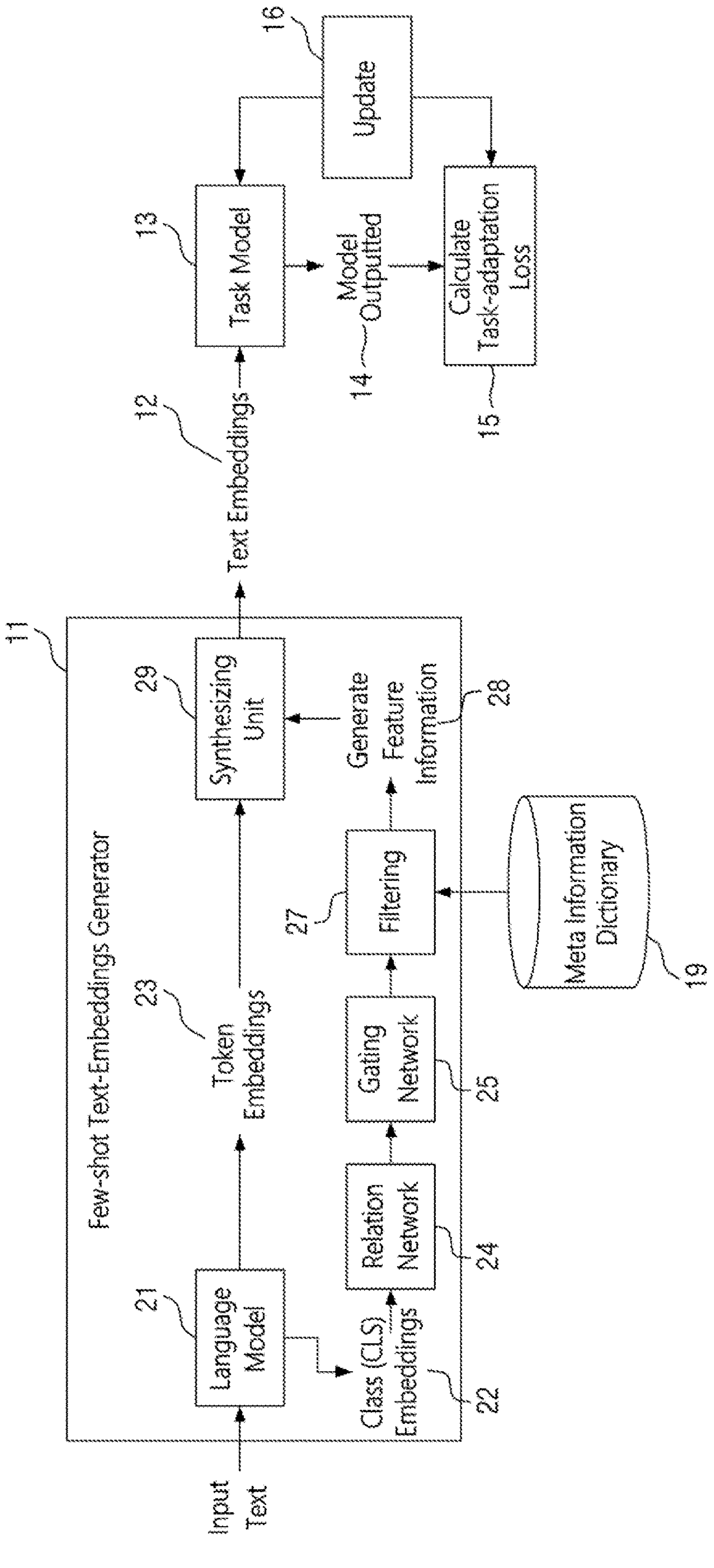
FIG. 3 is a diagram illustrating an overall process for generating text embeddings for few-shot text data and generating a task model, according to another embodiment of the present disclosure.

FIG. 3 is a diagram illustrating an overall process for generating text embeddings 12 for few-shot text data and generating a task model 13, according to another embodiment of the present disclosure. Referring to FIG. 3, the computing device 100 may be responsive to an input of few-shot text data for generating the text embeddings 12 reflecting the domain features of the few-shot text data.

Upon completion of the meta-learning based process of updating the parameters of the task model as described above with FIG. 1, the computing device 100 may apply an inner update step to the generation of a task model for classifying text data inputted in a real situation.

Specifically, the computing device 100 may be responsive to the few-shot text data as inputted to the few-shot text embedding generator 11 for outputting, by using the internal components of the few-shot text embedding generator 11, the text embeddings 12 reflecting the domain features of the text data.

The few-shot text embedding generator 11 includes the components of a language model 21, a relation network 24, a gating network 25, a filtering unit 27, and a synthesizing unit 29.

In the few-shot text embedding generator 11, when the few-shot text data is inputted to the language model 21, token embeddings 23 and CLS (class) embeddings 22 are generated. At this time, the relation network 24 generates a relation vector for representing the relationship between the CLS embeddings 22, and the gating network 25 generates, by using the relation vector, a gate vector for determining which information to extract from a meta information dictionary 19.

The filtering unit 27 utilizes the meta information dictionary 19 and the gate vector extracted from the gating network 25 to generate feature information 28 that corresponds to the domain of the few-shot text data. The synthesizing unit 29 synthesizes the generated feature information 28 and the token embeddings 23 to generate the text embeddings 12 reflecting domain features of the few-shot text data.

Through this process, the computing device 100 may process the newly inputted few-shot text data by using the meta information dictionary 19 to generate text embeddings 12 that are specific to the relevant domain.

At this time, the generated text embeddings 12 need a process of adapting to the task model 13. To this end, the computing device 100 inputs the generated text embedding 12 to the task model 13 to resultantly obtain an outputted task model at 14 and calculate a task-adaptation loss 15 for the task model 14. Using the task-adaptation loss 15, the computing device 100 may evaluate the task model 14 whether its adaptation to the text embeddings 12 is well done. Thereafter, through an update operation step 16, the computing device 100 may utilize the task-adaptation loss 15 to calculate how much to update the parameters of the task model 14 and reflect this calculation to the task model 13.

According to the embodiment as described above, when performing the classification of few-shot text data, the present disclosure works even without a large-scale language model itself needed to be tuned to the relevant domain, to generate the text embeddings and the task model reflecting the domain features of the few-shot text data and employ the generated text embeddings and task model in real-time.

Figure 4:
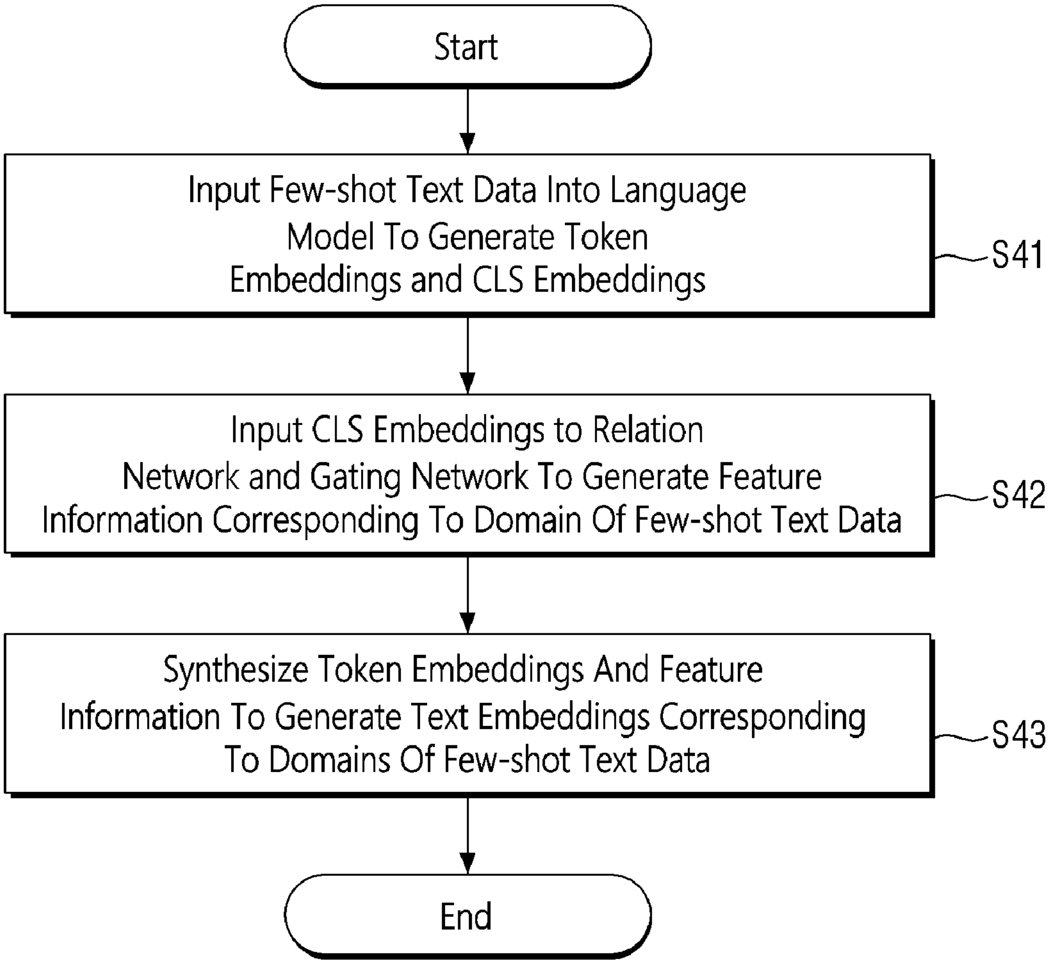
FIG. 4 is a flowchart of a method of generating text embeddings for few-shot text data, according to another embodiment of the present disclosure.

FIG. 4 is a flowchart of a method of generating text embeddings for few-shot text data, according to another embodiment of the present disclosure. FIG. 4 is to explain, within the overall process for generating the text embeddings 12 for few-shot text data and generating the task model 13 as described in FIG. 3, steps performed by the few-shot text embedding generator 11 for generating the text embeddings 12 for the few-shot text data.

The method of generating text embeddings for few-shot text data according to at least one embodiment of the present disclosure may be executed by the computing device 100. The computing device 100 executing the method according to embodiments of the present disclosure may be a computing device having an environment for executing an application program. It should be noted that the present disclosure may omit, from the description, the subject performing some operations included in the method according to the embodiments of the present disclosure, wherein the subject is the computing device 100.

Referring to FIG. 4, Step S41 firstly inputs few-shot text data into the language model to generate the token embeddings and CLS embeddings. In this case, the method may use as the language model, BERT, GPT-3, etc., which are pre-trained large-scale language models.

Next, Step S42 inputs the CLS embeddings to the relation network and the gating network to generate the feature information that corresponds to the domain of the few-shot text data.

As an embodiment, Step S42 may include a step of filtering, by using the gating network, the feature information that corresponds to the domain of the few-shot text data, from the meta-information dictionary including feature information for a plurality of domain-specific texts.

Here, the meta-information dictionary may be generated through a meta-learning process for the task model. The meta-learning process may include steps including calculating a task-adaptation loss of the task model based on a result of training the task model by using a train data set, updating the task model based on the task-adaptation loss, calculating a meta-optimization loss of the updated task model by using a validation data set, and further updating the updated task model based on the meta-optimization loss.

Finally, Step S43 synthesizes the token embeddings generated in Step S41 and the feature information generated in Step S42 to generate text embeddings corresponding to the domain of the few-shot text data.

The method further includes, after performing Step S43, steps including inputting the generated text embeddings into a task model, calculating a task-adaptation loss of the task model based on a result outputted from the task model, and updating the task model based on the task-adaptation loss.

Figure 5:
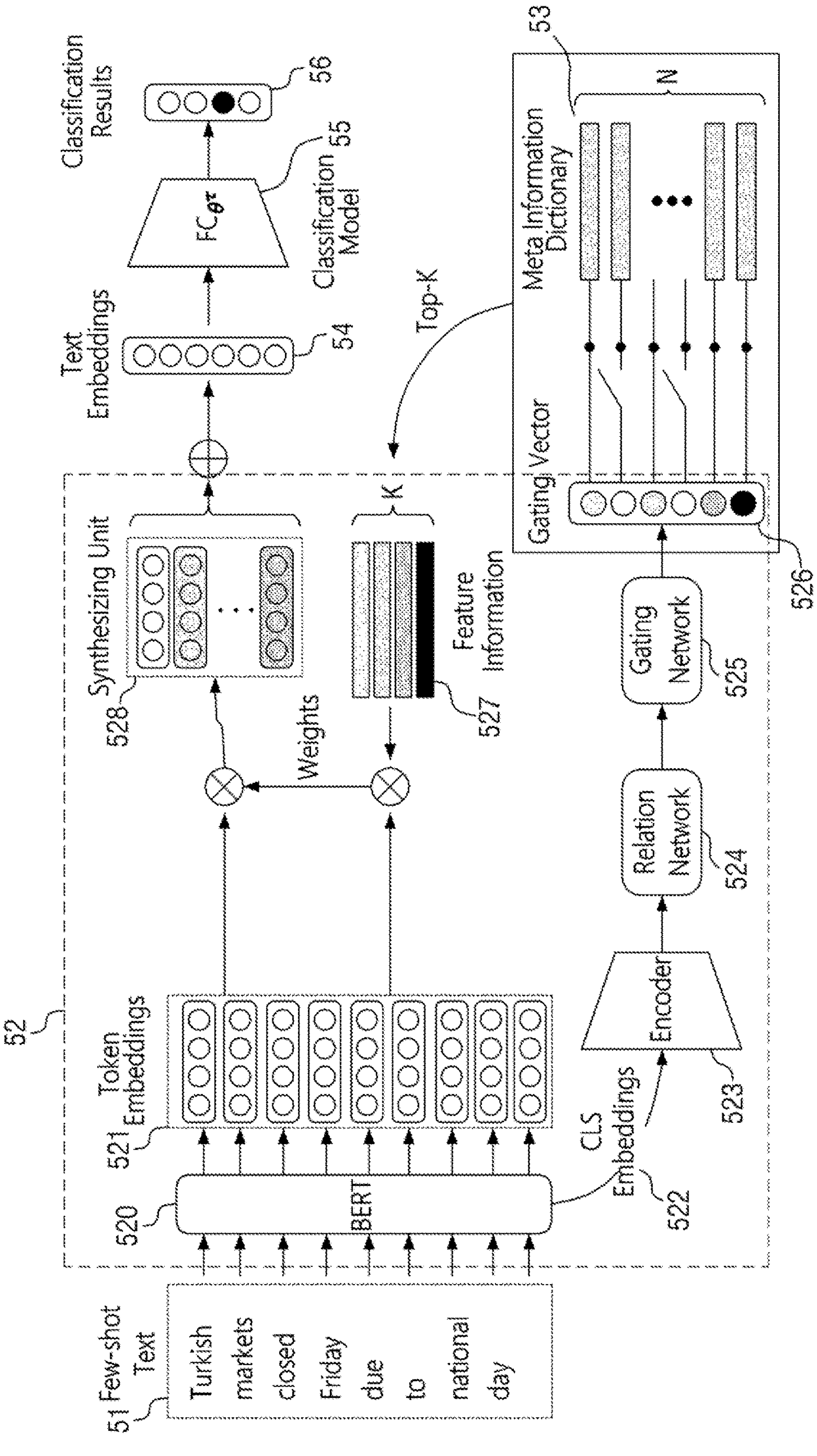
FIG. 5 illustrates a process of generating a task model for a new domain, according to some embodiments of the present disclosure.

FIG. 5 illustrates a process of generating a task model for a new domain, according to some embodiments of the present disclosure. Referring to FIG. 5, the computing device 100 may use a few-shot text embedding generator 52 to generate, for inputted few-shot text data 51, text embeddings 54 that are specific to the relevant domains. The few-shot text embedding generator 52 may include a BERT 520, an encoder 523, a relation network 524, a gating network 525, and a synthesizing unit 528.

In the illustrated example, the few-shot text data 51 is firstly inputted to a language model such as BERT 520, from which token embeddings 521 and CLS embeddings 522 can be generated.

The encoder 523 serves to reduce the dimension of class vectors corresponding to the CLS embeddings 522 generated from the BERT 520. The relation network 524 encodes the relationship between the class vectors whose dimensions are reduced through the encoder 523 and outputs the encoded relationship as a relation vector. In this case, the relation vector may be expressed by an equation at 61 in FIG. 6A, where $$e_n^{\tau_i}$$

means a relation vector for class n in a given domain $\tau_i$, $f_{\theta_r}$ denotes a relation network, and $f_{\theta_e}$ denotes an encoder.

$$c_j^{\tau_i}$$

denotes a class vector generated from the BERT 520 for the j-th text data.

The gating network 525 generates a gating vector 526 for extracting the most relevant k pieces of feature information among the relation vectors outputted through the relation network 524. At this time, the gating vector 526 may be expressed by an equation at 62 in FIG. 6B, wherein $$g_n^{\tau_i}$$

means a gating vector using a given input $$\left(e_n^{\tau_i}, W_g, W_n, k\right)$$

with all elements but k being zero.

In this case, k pieces of feature information 527 suitable for the relevant domains may be extracted through a multiplication operation between the gating vector 526 and a meta information dictionary 53 including N pieces of feature information. At this time, the extracted k pieces of feature information 527 may be expressed by an equation at 63 in FIG. 6C, where $W_A$ means a meta information dictionary, and $$W_A^{\tau_i}$$

means feature information.

The synthesizing unit 528 may generate the domain-specific text embeddings 54 of the few-shot text data 51 by multiplying the extracted k pieces of feature information 527 by the token embeddings 521.

The text embeddings 54 generated according to the above process are inputted to a classification model 55, thereby providing classification results 56.

FIG. 7 illustrates the performances of classification models according to some embodiments of the present disclosure compared to other classification models for few-shot text data. TABLE I in FIG. 7A and TABLE II in FIG. 7B are tables comparing the performances of the classification models (OUR) according to some embodiments of the present disclosure with the existing methods.

For performance comparison between models, four types of data were used such as 20 Newsgroup, Huffpost Headlines, Reuters-21578, and RCV-1 as text data for research, and, for comparison with the classification model (OUR) of the present disclosure, models were used such as MAML, prototype-network (PROTO), latent embedding optimization (LEO), induction network (INDUCTION), and distributional signature (DS) models. Additionally, BERT's class vector (CLS vector) was used to evaluate the performance of the models.

For performance comparison between classification models of few-shot text data, the N-way K-shot method may be used, which is a method using K data samples for N classes. As an example, to compare the performance between the models, TABLE I used the 5-way 1-shot classification method, and TABLE II used the 5-way 5-shot classification method.

TABLE I and TABLE II confirm that the classification model (OUR) of the present disclosure exhibits higher performance over the existing methods in the matter of classification of few-shot text data.

FIG. 8 is a hardware configuration diagram of an exemplary computing device 100.

Referring to FIG. 8, the computing device 100 may include one or more processors 101, a bus 107, a network interface 102, a memory 103, which loads a computer program 105 executed by the processors 101, and a storage 104 for storing the computer program 105.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing device 100 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

In at least one embodiment, the computer program 105 may include computer-executable instructions for executing method steps including calculating a task-adaptation loss of the task model based on a result of training the task model by using a train data set, updating the task model based on the task-adaptation loss, calculating a meta-optimization loss of the updated task model by using a validation data set, and further updating the updated task model based on the meta-optimization loss.

In at least one embodiment, the computer program 105 may include computer-executable instructions for executing method steps including generating generate token embeddings and CLS embeddings by inputting few-shot text data into a language model, generating feature information corresponding to a domain of the few-shot text data by inputting the CLS embeddings into a relation network and a gating network, and generating text embeddings corresponding to the domain of the few-shot text data by synthesizing the token embeddings and the feature information.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

The invention claimed is:

1. A method performed by a processor of a computing device for generating a task model based on meta-learning, the method comprising:

calculating a task-adaptation loss of the task model, the calculating the task-adaptation loss being based on a result of training the task model by using a training data set including a plurality of domain-specific text data;

updating the task model based on the task-adaptation loss;

calculating a meta-optimization loss of the updated task model by using a validation data set including the plurality of domain-specific text data;

generating a meta-trained task model by further updating the updated task model based on the meta-optimization loss;

generating token embeddings and class embeddings by inputting few-shot text data of a first domain into a language model;

acquiring a feature information corresponding to the first domain by inputting the class embeddings into a relation network and a gating network, the feature information being extracted through an operation between gating vector generated by the gating network and a meta information dictionary including feature information for the plurality of domain-specific text data;

generating text embeddings for the first domain by synthesizing the token embeddings and the acquired feature information; and providing a result output from the meta-trained task model generated by inputting the text embeddings for the first domain into the meta-trained task model.

2. The method of claim 1, wherein the task model comprises:

a text classification model configured to provide classification results for texts.

3. The method of claim 1, wherein the updating of the task model comprises:

updating parameters of the task model based on the task-adaptation loss.

4. The method of claim 1, wherein the further updating of the updated task model further comprises:

updating the meta-information dictionary including feature information for a plurality of domain-specific texts; and updating parameters of a few-shot text embedding generator configured to generate text embeddings corresponding to inputted few-shot text data.

5. The method of claim 1, wherein the task-adaptation loss and the meta-optimization loss are calculated based on a cross-entropy loss function.

6. The method of claim 1, wherein the updating of the task model comprises:

updating parameters of the task model by using gradient descent.

7. A computing device, comprising:

one or more processors;

a communication interface configured to communicate with external devices;

a memory configured to load a computer program that is executed by the one or more processors; and a storage configured to store the computer program, wherein the computer program includes computer-executable instructions for causing, when executed in the computing device, cause the computing device to:

calculating a task-adaptation loss of a task model, the calculating the task-adaptation loss being based on a result of training the task model by using a training data set including a plurality of domain-specific text data;

updating the task model based on the task-adaptation loss;

calculating a meta-optimization loss of the updated task model by using a validation data set including the plurality of domain-specific text data;

generating a meta-trained task model by further updating the updated task model based on the meta-optimization loss;

generating token embeddings and class embeddings by inputting few-shot text data of a first domain into a language model:

acquiring a feature information corresponding to the first domain by inputting the class embeddings into a relation network and a gating network, the feature information being extracted through an operation between gating vector generated by the gating network and a meta information dictionary including feature information for the plurality of domain-specific text data;

generating text embeddings for the first domain by synthesizing the token embeddings and the acquired feature information; and providing a result output from the meta-trained task model generated by inputting the text embeddings for the first domain into the meta-trained task model.

8. The computing device of claim 7, wherein the task model comprises:

a text classification model configured to provide classification results for texts.

9. The computing device of claim 7, wherein the updating of the task model includes:

updating parameters of the task model based on the task-adaptation loss.

10. The computing device of claim 7, wherein the further updating of the updated task model includes:

updating the meta-information dictionary including feature information for a plurality of domain-specific texts; and updating parameters of a few-shot text embedding generator configured to generate text embeddings corresponding to inputted few-shot text data.

11. The computing device of claim 7, wherein the task-adaptation loss and the meta-optimization loss are calculated based on a cross-entropy loss function.

12. The computing device of claim 7, wherein the updating of the task model includes:

updating parameters of the task model by using gradient descent.

* * * * *